(12) United States Patent
Mannherz et al.

(10) Patent No.: US 12,090,974 B2
(45) Date of Patent: Sep. 17, 2024

(54) CONTROL DEVICE AND METHOD FOR OPERATING A VEHICLE DECELERATION DEVICE OF A VEHICLE

(71) Applicant: Robert Bosch GmbH, Stuttgart (DE)

(72) Inventors: Edith Mannherz, Yokohama (JP); Julian Staack, Ilsfeld-Auenstein (DE); Michael Kunz, Plymouth, MI (US); Thomas Bruex, Sachsenheim-Kleinsachsenheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 440 days.

(21) Appl. No.: 16/639,781

(22) PCT Filed: Jul. 12, 2018

(86) PCT No.: PCT/EP2018/068896
§ 371 (c)(1),
(2) Date: Mar. 31, 2020

(87) PCT Pub. No.: WO2019/037941
PCT Pub. Date: Feb. 28, 2019

(65) Prior Publication Data
US 2020/0216051 A1    Jul. 9, 2020

(30) Foreign Application Priority Data
Aug. 22, 2017   (DE) ...................... 10 2017 214 602.8

(51) Int. Cl.
*B60T 13/66*    (2006.01)
*B60T 7/04*    (2006.01)
(Continued)

(52) U.S. Cl.
CPC ............. *B60T 13/662* (2013.01); *B60T 7/042* (2013.01); *B60T 8/17* (2013.01); *B60T 13/146* (2013.01);
(Continued)

(58) Field of Classification Search
CPC .......... B60T 13/662; B60T 7/042; B60T 8/17; B60T 13/146; B60T 13/686; B60T 13/745; B60T 2220/04
See application file for complete search history.

(56) References Cited

U.S. PATENT DOCUMENTS 4,685,745 A * 8/1987 Reinecke ................ B60T 17/18
303/191
5,261,513 A   11/1993 Vogelsang
(Continued)

FOREIGN PATENT DOCUMENTS

CN   101566200     10/2009
CN   104379418 A    2/2015
(Continued)

OTHER PUBLICATIONS

International Search Report dated Oct. 8, 2018 for corresponding International Application PCT/EP2018/068896 filed Jul. 12, 2018.

*Primary Examiner* — Fadey S. Jabr
*Assistant Examiner* — Naeem Taslim Alam
(74) *Attorney, Agent, or Firm* — NORTON ROSE FULBRIGHT US LLP; Gerard A. Messina (57) ABSTRACT

A control device for a vehicle deceleration device of a vehicle including an electronics unit, with the aid of which a time curve of an input variable predefined by a driver of the vehicle with the aid of an actuation of the brake actuating element is evaluatable and the vehicle deceleration device is activatable taking into account the updated input variable and a characteristic curve, which specifies a relationship (Continued)

between the input variable and a setpoint variable with respect to a setpoint vehicle deceleration to be exerted on the vehicle with the aid of the vehicle deceleration device. The electronics unit detects at least one modulation and/or variation of the input variable triggered by the driver and reestablishes at least one subsection of the characteristic curve taking into account the at least one modulation and/or variation of the input variable ($x_{input}$) triggered by the driver.

12 Claims, 3 Drawing Sheets

(51) Int. Cl.
    *B60T 8/17*     (2006.01)
    *B60T 13/14*     (2006.01)
    *B60T 13/68*     (2006.01)
    *B60T 13/74*     (2006.01)

(52) U.S. Cl.
    CPC ........... *B60T 13/686* (2013.01); *B60T 13/745* (2013.01); *B60T 2220/04* (2013.01)

(56) References Cited

U.S. PATENT DOCUMENTS

| | | | |
|---|---|---|---|
| 6,457,785 B1* | 10/2002 | Yonemura | B60T 7/042 303/9.62 |
| 2005/0017574 A1* | 1/2005 | Weiberle | B60T 13/741 303/3 |
| 2007/0112537 A1* | 5/2007 | Gronau | B60T 15/028 702/105 |
| 2012/0139330 A1* | 6/2012 | Morishita | B60T 13/586 303/3 |
| 2012/0310502 A1* | 12/2012 | Garbe | B60T 7/042 701/70 |
| 2013/0197771 A1* | 8/2013 | Takeda | B60T 13/745 701/70 |
| 2015/0020520 A1* | 1/2015 | Feigel | B60T 8/3655 60/534 |
| 2016/0129895 A1* | 5/2016 | Masuda | B60T 8/1755 701/70 |
| 2016/0334790 A1* | 11/2016 | Rust | B60T 13/662 |
| 2017/0113693 A1* | 4/2017 | Bularz | B60W 30/18027 |
| 2017/0320474 A1* | 11/2017 | Svensson | B60T 17/02 |
| 2018/0086323 A1* | 3/2018 | Moore | B60T 8/442 |
| 2018/0141526 A1* | 5/2018 | Li | B60T 8/172 |
| 2018/0354475 A1* | 12/2018 | Carritte | B60T 8/38 |
| 2019/0315322 A1* | 10/2019 | Goto | B60T 7/12 |

FOREIGN PATENT DOCUMENTS

| | | |
|---|---|---|
| DE | 4136759 | 5/1993 |
| DE | 102004048120 | 4/2006 |
| DE | 202010017605 | 10/2012 |
| DE | 102012215138 A1 | 2/2014 |
| DE | 102014206649 | 2/2015 |
| DE | 102015212188 A1 | 1/2017 |
| WO | 2007012354 | 2/2007 |

* cited by examiner

CONTROL DEVICE AND METHOD FOR OPERATING A VEHICLE DECELERATION DEVICE OF A VEHICLE

FIELD

The present invention relates to a control device for a vehicle deceleration device of a vehicle. The present invention also relates to a vehicle deceleration device for a vehicle. Furthermore, the present invention relates to a method for operating a vehicle deceleration device of a vehicle.

BACKGROUND INFORMATION

A controller of an electromechanical brake booster is described in German Patent Application No. DE 20 2010 017 605 U1, which activates the electromechanical brake booster taking into account signals of a sensor unit, with the aid of which a displacement travel of an input element is determinable, and a characteristic curve stored in the controller. An assistance force effectuated with the aid of the electromechanical brake booster is to be settable according to the characteristic curve by the activation of the electromechanical brake booster.

SUMMARY

The present invention provides a control device for a vehicle deceleration device of a vehicle, a vehicle deceleration device for a vehicle, and a method for operating a vehicle deceleration device of a vehicle.

The present invention provides options for self-learning adaptation of a characteristic curve of a vehicle deceleration device to preferences of a driver of a vehicle/motor vehicle equipped with the particular vehicle deceleration device. For this purpose, with the aid of the present invention, parameters/characteristics of the characteristic curve perceived to be personally unsuitable by the driver may be recognized on the basis of the modulations and/or variations of the input variable triggered by the driver and redefined in a more driver-friendly manner with the aid of a change of the particular parameters/characteristics of the characteristic curve. In particular, in this manner, the characteristic curve perceived to be personally preferable by the driver may be recognized and subsequently implemented with the aid of a corresponding activation of the vehicle deceleration device. The present invention therefore contributes significantly to increasing a braking comfort of the driver actuating the associated brake actuating element.

In one advantageous specific embodiment of the example control device in accordance with the present invention, the electronics unit is additionally designed to determine a frequency and/or a modulation strength of modulations and/or variations triggered by the driver during at least one brake application. The electronics unit may subsequently improve the characteristic curve with respect to the preferences of the driver taking into account the established frequency and/or the established modulation strength.

For example, if the determined frequency is greater than a predefined frequency threshold value at least sectionally along the characteristic curve and/or the determined modulation strength is greater than a predefined strength threshold value at least sectionally along the characteristic curve, the electronics unit is designed to reestablish the at least one affected subsection of the characteristic curve and to store the correspondingly changed characteristic curve on the storage unit. In this way, it may be "learned" due to the determined frequency and/or the determined modulation strength which preferences the driver has with respect to the characteristic curve.

In one alternative specific embodiment of the example control device in accordance with the present invention, the electronics unit may additionally be designed, for at least one first characteristic curve, to determine at least one first frequency and/or at least one first modulation strength during at least one first brake application, for a second characteristic curve, which includes at least one reestablished subsection in comparison to the at least one first characteristic curve, to determine a second frequency and/or a second modulation strength during at least one second brake application, to compare the at least one first frequency and/or the at least one first modulation strength to the second frequency and/or the second modulation strength and, if an increase of modulations and/or variations of the input variable is establishable at least sectionally along the second characteristic curve due to the frequencies being compared to one another and/or a strengthening of modulations and/or variations of the input variable is establishable at least sectionally along the second characteristic curve due to the modulation strengths being compared to one another, to reestablish at least the at least one affected subsection of the characteristic curve. This specific embodiment of the control device is also suitable for the targeted adaptation of the characteristic curve to preferences of the driver.

The example electronics unit according to the present invention is preferably designed to examine a time curve of a pedal travel, a time curve of an input rod travel, a time curve of a differential motion, a time curve of a driver braking force exerted on the brake actuating element, and/or a time curve of a brake master cylinder pressure in a brake master cylinder downstream from the brake actuating element as the time curve of the input variable for a possible occurrence of at least one modulation and/or variation of the input variable triggered by the driver. In the case of a characteristic curve of the vehicle deceleration device which is personally unsuitable for him or her, the driver modulates his or her actuation of the brake actuating element multiple times and significantly in the course of a brake application. These multiple and significant modulations/variations (which are also frequently referred to as driver modulations) may be reliably recognized with the aid of the examples mentioned here for the input variable.

For example, the characteristic curve may specify a relationship between the input variable and a setpoint amperage to be output to a brake booster upstream from the brake master cylinder, a relationship between the input variable and a setpoint speed of a motor of the brake booster, a relationship between the input variable and a setpoint booster force of the brake booster, a relationship between the input variable and a setpoint brake pressure in at least one wheel brake cylinder of a hydraulic braking system, a relationship between the input variable and a setpoint braking torque of the at least one wheel brake cylinder, and/or a relationship between the input variable and the setpoint vehicle deceleration. The present invention described here is well-suited for the self-learning adaptation of all characteristic curve types listed here to the preferences of the driver. However, it is to be noted that a usability of the present invention is not limited to the characteristic curve types mentioned here.

The example electronics unit in accordance with the present invention is preferably designed to activate, taking into account the characteristic curve and the present input variable, the brake booster upstream from the brake master cylinder, at least one piston-cylinder device of the hydraulic braking system, and/or at least one pump of the hydraulic braking system as the vehicle deceleration device. The control device may thus be used for a variety of different types of vehicle deceleration devices. The usability of the control device is not restricted to the vehicle deceleration devices listed here, however.

An example vehicle deceleration device for a vehicle including a corresponding example control device in accordance with the present invention also yields the above-described advantages. The example vehicle deceleration device may be, for example, the brake booster, the piston-cylinder device, a pump system including the at least one pump, or the, for example, hydraulic, pneumatic, or electrical braking system. Further examples of the vehicle deceleration device are possible.

Furthermore, an execution of a corresponding example method for operating a vehicle deceleration device of a vehicle, in accordance with the present invention, also provides the above-mentioned advantages. It is to be expressly noted that the example method for operating a vehicle deceleration device of a vehicle is refinable according to the above-explained specific embodiments of the example control device.

BRIEF DESCRIPTION OF THE DRAWINGS

Further features and advantages of the present invention are explained hereafter based on the figures.

DETAILED DESCRIPTION OF EXAMPLE EMBODIMENTS

Figure 1A:
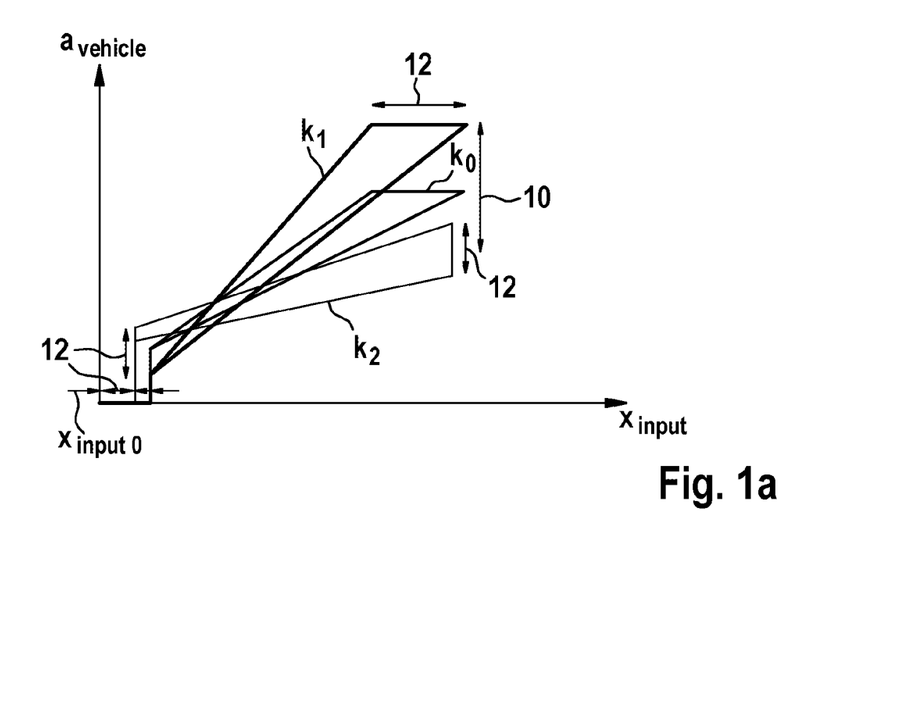
FIGS. 1a through 1c show coordinate systems to explain a functionality of one specific embodiment of the control device for a vehicle deceleration device of a vehicle.
Figure 1B:
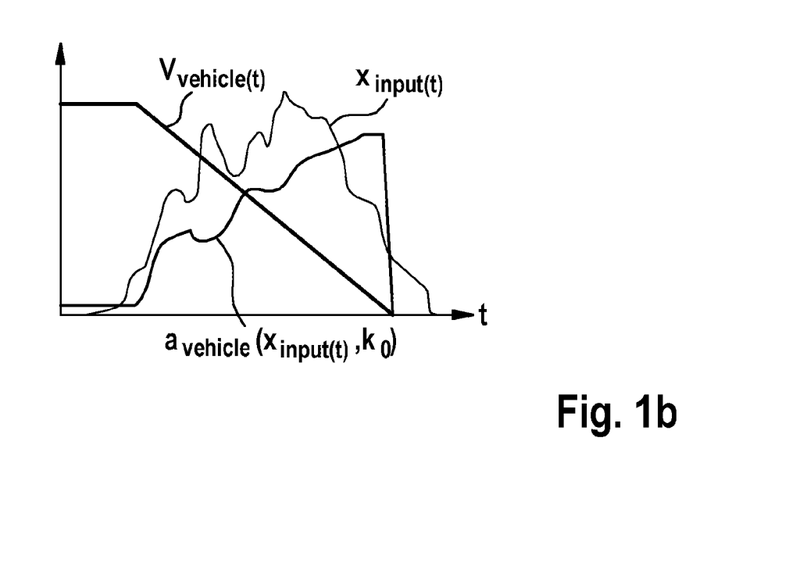
Figure 1C:
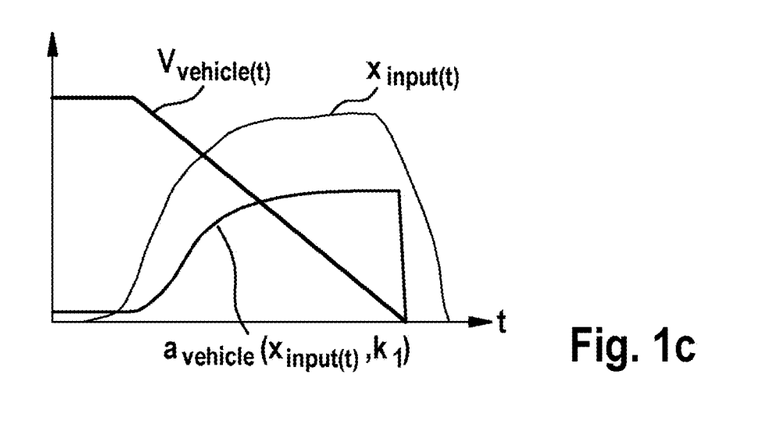

FIGS. 1a through 1c show coordinate systems to explain a functionality of one specific embodiment of the control device for a vehicle deceleration device of a vehicle.

The example control device explained hereafter with the aid of the coordinate systems of FIGS. 1a through 1c includes an electronics unit, which is connectable/connected to a brake actuating element of the vehicle and/or to at least one brake actuating element sensor of the vehicle in such a way that a time curve of an input variable $x_{input}$ specified by a driver of the vehicle with the aid of an actuation of the brake actuating element may be evaluated with the aid of the electronics unit. For this purpose, the control device may be electrically connectable/connected to the brake actuating element and/or the at least one brake actuating element sensor in such a way that the time curve of input variable $x_{input}$ is receivable by the electronics unit with the aid of at least one signal output by the brake actuating element and/or the at least one brake actuating element sensor.

The brake actuating element may be understood, for example, as a brake pedal of the vehicle, while the at least one brake actuating element sensor may be, for example, a pedal travel sensor or pedal angle sensor, a rod travel sensor, a differential motion sensor, a driver braking force sensor, and/or a brake master cylinder pressure sensor/pilot pressure sensor. The electronics unit may be designed in particular to evaluate a time curve of a pedal travel, a time curve of an input rod travel, a time curve of a differential motion, a time curve of a driver braking force exerted on the brake actuating element, and/or a time curve of a brake master cylinder pressure (or a time curve of a pilot pressure) in a brake master cylinder downstream from the brake actuating element as the time curve of input variable $x_{input}$. The examples mentioned here for the brake actuating element, the at least one brake actuating element sensor, and input variable $x_{input}$ are only to be interpreted as examples, however. Input variable $x_{input}$ may be understood in particular as any variable reflecting a driver braking intention.

The example control device also includes a storage unit, on which a characteristic curve $k_0$, $k_1$, or $k_2$ is stored. Characteristic curve $k_0$, $k_1$, or $k_2$ specifies a relationship between input variable $x_{input}$ and a setpoint variable $a_{vehicle}$ with respect to a setpoint vehicle deceleration $a_{vehicle}$ to be exerted on the vehicle with the aid of the vehicle deceleration device. The example electronics unit is designed to activate the vehicle deceleration device taking into account characteristic curve $k_0$, $k_1$, or $k_2$ and present input variable $x_{input}$. The vehicle deceleration device is advantageously activatable with the aid of the electronics unit in such a way that a present setpoint deceleration $a_{vehicle}$ in accordance with characteristic curve $k_0$, $k_1$, or $k_2$ and present input variable $x_{input}$ may be exerted on the vehicle with the aid of the vehicle deceleration device. The vehicle deceleration device activatable with the aid of the electronics unit may include, for example, a brake booster (upstream from the brake master cylinder), at least one piston-cylinder device of a hydraulic braking system, and/or at least one pump of the hydraulic braking system. The brake booster (upstream from the brake master cylinder) may in particular be an electromechanical brake booster (iBooster). The examples mentioned here for the vehicle deceleration device are not to be interpreted as restrictive, however.

In the coordinate system of FIG. 1a, input variable $x_{input}$ is shown with the aid of the abscissa, while an ordinate indicates setpoint vehicle deceleration $a_{vehicle}$ as setpoint variable $a_{vehicle}$. In the coordinate system of FIG. 1a, selection characteristic curves $k_0$, $k_1$, or $k_2$ are shown, of which each selection characteristic curve $k_0$, $k_1$, or $k_2$ specifies one relationship (selectable with the aid of the procedure described hereafter) between input variable $x_{input}$ and setpoint vehicle deceleration $a_{vehicle}$. Alternatively or additionally thereto, however, at least one (further) characteristic curve may also be stored on the storage unit, which specifies a relationship between input variable $x_{input}$ and a setpoint amperage to be output at the (electromechanical) brake booster (upstream from the brake master cylinder), a relationship between input variable $x_{input}$ and a setpoint speed of a motor of the (electromechanical) brake booster, a relationship between input variable $x_{input}$ and a setpoint booster force of the brake booster, a relationship between input variable $x_{input}$ and a setpoint brake pressure in at least one wheel brake cylinder of the hydraulic braking system, and/or a relationship between input variable $x_{input}$ and a setpoint braking torque of the at least one wheel brake cylinder.

The example electronics unit is additionally designed to detect at least one modulation and/or variation triggered by the driver of input variable $x_{input}$. The at least one modulation and/or variation (detectable with aid of the electronics unit) may be understood as a sudden change of input variable $x_{input}$, which is to be attributed to a correction desired by the driver of his or her actuation of the brake actuating element. The modulation and/or variation triggered by the driver of input variable $x_{input}$ is displayed, for example, as "jags," local minimum, local maximum, jumping motion, and/or trembling motion on the time curve of input variable $x_{input}$. The electronics unit may optionally be designed to examine the time curve of the pedal travel, the time curve of the input rod travel, the time curve of the differential motion, the time curve of the driver brake pressure exerted on the brake actuating element, and/or the time curve of the brake master cylinder pressure (the pilot pressure) for a possible occurrence of at least one modulation and/or variation triggered by the driver of input variable $x_{input}$.

In the coordinate system of FIG. 1b, an abscissa is a time axis t, while with the aid of an ordinate, input variable $x_{input}$ (t), a vehicle velocity $v_{vehicle}(t)$ of the vehicle, and established setpoint vehicle deceleration $a_{vehicle}$ ($x_{input}$ (t), $k_0$) (taking into account selection characteristic curve $k_0$ established as the characteristic curve and input variable $x_{input}$) are shown. It is apparent due to the time curve of input variable $x_{input}$ shown in the coordinate system of FIG. 1b that the driver triggers comparatively frequent and relatively strong modulations and/or variations of input variable $x_{input}$ during this brake application. (A reliable recognition of modulations and/or variations of input variable $x_{input}$ is possible with the aid of an algorithm integrated into the electronics unit.) Characteristic curve $k_0$, which is used in the conversion of present input variable $x_{input}$ into present setpoint vehicle deceleration $a_{vehicle}$ thus does not correspond to a braking characteristic of the vehicle deceleration device perceived by the driver as personally suitable for him or her.

The example electronics unit is therefore also designed to reestablish at least one subsection of the characteristic curve (previously identical to selection characteristic curve $k_0$) taking into account the at least one modulation and/or variation triggered by the driver of input variable $x_{input}$ and to store the correspondingly changed characteristic curve (as the applicable characteristic curve/characteristic curve to be used) on the storage unit. The control device therefore offers a self-learning adaptation of characteristic curve $k_0$, $k_1$, or $k_2$ upon the activation of the vehicle deceleration device due to the modulations and/or variations triggered by the driver to personal preferences of the particular driver. The self-learning adaptation of characteristic curve $k_0$, $k_1$, or $k_2$ upon the activation of the vehicle deceleration device thus gives the driver an increased feeling of safety, reliability, and trust in his or her vehicle.

In particular, a reestablishment of the entire characteristic curve (previously identical to selection characteristic curve $k_0$) may be carried out taking into account the at least one modulation and/or variation triggered by the driver (and recognized) of input variable $x_{input}$. This may be carried out (as shown with the aid of arrow 10 in the coordinate system of FIG. 1a), for example, by selecting a selection characteristic curve $k_1$ or $k_2$ stored on the storage unit, reestablishment of selected selection characteristic curve $k_1$ or $k_2$ as characteristic curve $k_1$ or $k_2$, and storing reestablished characteristic curve $k_1$ or $k_2$ on the storage unit. As is also outlined with the aid of arrows 12 in the coordinate system of FIG. 1a, however, at least one parameter of (effective) characteristic curve $k_0$, $k_1$, or $k_2$ may also be varied taking into account the at least one modulation and/or variation triggered by the driver (and detected) of input variable $x_{input}$. For example, a "null section" of (effective) characteristic curve $k_0$, $k_1$, or $k_2$ for input variables $x_{input}$ less than an input variable threshold value $x_{input}$ 0, a "step height" of (effective) characteristic curve $k_0$, $k_1$, or $k_2$ upon overcoming input variable threshold value $x_{input}$ 0, and/or at least one hysteresis breadth of (effective) characteristic curve $k_0$, $k_1$, or $k_2$ may be varied as the at least one parameter taking into account the at least one modulation and/or variation triggered by the driver (and detected) of input variable $x_{input}$. Alternatively or additionally to a variation of input variable threshold value $x_{input}$ 0, the "step height" and/or the at least one hysteresis breadth, however, at least one slope of (effective) characteristic curve $k_0$, $k_1$, or $k_2$, at least one minimum value of (effective) characteristic curve $k_0$, $k_1$, or $k_2$, and/or at least one maximum value of (effective) characteristic curve $k_0$, $k_1$, or $k_2$ may also be varied. With the aid of the reestablishment of characteristic curve $k_0$, $k_1$, or $k_2$, in particular an "entry behavior" and/or an "amplification behavior" of the vehicle deceleration device may be made more driver friendly. A step-by-step and continuous adaptation of the "entry behavior" and/or of the "amplification behavior" of the vehicle deceleration device to the preferences of the driver is possible.

All above-described procedures for reestablishing (effective) characteristic curve $k_0$, $k_1$, or $k_2$ may be used for a "driver-specific improvement" of characteristic curve $k_0$, $k_1$, or $k_2$. The "driver-specific improvement" of characteristic curve $k_0$, $k_1$, or $k_2$ is recognizable due to a reduction/drop of modulations and/or variations triggered by the driver of input variable $x_{input}$. In the coordinate system of FIG. 1c, an abscissa is a time axis t, while input variable $x_{input}$ (t), vehicle velocity $v_{vehicle}(t)$ of the vehicle and established setpoint vehicle deceleration $a_{vehicle}$ ($x_{input}(t)$ $k_1$) (taking into account selection characteristic curve $k_1$ established as a characteristic curve and input variable $x_{input}$) are shown with the aid of an ordinate. It is apparent that in the case of the brake application shown with the aid of FIG. 1c, the driver does not trigger modulations and/or variations of input variable $x_{input}$. The braking characteristic of the vehicle deceleration device thus corresponds to a personal preference of the driver during the execution of the brake application shown with the aid of FIG. 1c.

The electronics unit may be designed, for example, to determine a frequency and/or a modulation strength of modulations and/or variations triggered by the driver of input variable $x_{input}$ during at least one brake application. If the determined frequency is greater than a predefined frequency threshold value at least sectionally along characteristic curve $k_0$, $k_1$, or $k_2$ and/or the determined modulation strength is greater than a predefined strength threshold value at least sectionally along characteristic curve $k_0$, $k_1$, or $k_2$, the electronics unit may be designed to reestablish at least the at least one affected subsection of characteristic curve $k_0$, $k_1$, or $k_2$ and to store the correspondingly changed characteristic curve (as the effective characteristic curve/characteristic curve to be used) on the storage unit.

Alternatively, the electronics unit may also be designed to firstly determine, for at least one first characteristic curve $k_0$, at least one first frequency (caused by maintaining first characteristic curve $k_0$) and/or at least one first modulation strength (caused by maintaining first characteristic curve $k_0$), for example, the frequency and/or the modulation strength of the modulations and/or variations shown in FIG. 1b, during at least one first brake application and to store it for a later comparison. After a reestablishment of a second characteristic curve $k_1$, which in each case includes at least one reestablished subsection in comparison to the at least one first characteristic curve $k_0$, for second characteristic curve $k_1$, a second frequency (caused by maintaining second characteristic curve $k_1$) and/or a second modulation strength (caused by maintaining second characteristic curve $k_1$), for example, the frequency and/or the modulation strength of the modulations and/or variations shown in FIG. 1c, may be determined during at least one second brake application. The electronics unit may be designed to compare the at least one first frequency and/or the at least one first modulation strength to the second frequency and/or the second modulation strength and, if an increase of modulations and/or variations of input variable $x_{input}$ at least sectionally along second characteristic curve $k_1$ is establishable due to the frequencies being compared to one another and/or a strengthening of modulations and/or variations of input variable $x_{input}$ is establishable at least sectionally along second characteristic curve $k_1$ due to the modulation strengths being compared to one another, to reestablish at least the at least one affected subsection of second characteristic curve $k_1$.

To reestablish characteristic curve $k_0$, $k_1$, or $k_2$ (or at least a subsection of characteristic curve $k_0$, $k_1$, or $k_2$), an algorithm may be stored on the electronics unit (by a manufacturer of the control device), which specifies a fixed/predefined sequence during the driver-specific adaptation of characteristic curve $k_0$, $k_1$, or $k_2$. In particular, a number of characteristic curves $k_0$, $k_1$, or $k_2$ and/or characteristic curve parameters may be tested in succession according to the fixed/predefined sequence until the preferences of the driver are recognized. As an alternative to the above-described procedure, the electronics unit may also include an algorithm which itself "decides" in which direction a reestablishment of characteristic curve $k_0$, $k_1$, or $k_2$ (or at least a subsection of characteristic curve $k_0$, $k_1$, or $k_2$) is tested upon a response of the driver.

The above-described advantages are also ensured in a vehicle deceleration device which includes the control device (as a component). The advantages may also be effectuated if the control device interacts with a vehicle deceleration device formed separately therefrom. In both cases, the vehicle deceleration device may be, for example, a brake booster (in particular an electromechanical brake booster), a piston-cylinder device, a pump system including at least one pump, or a braking system.

Figure 2:
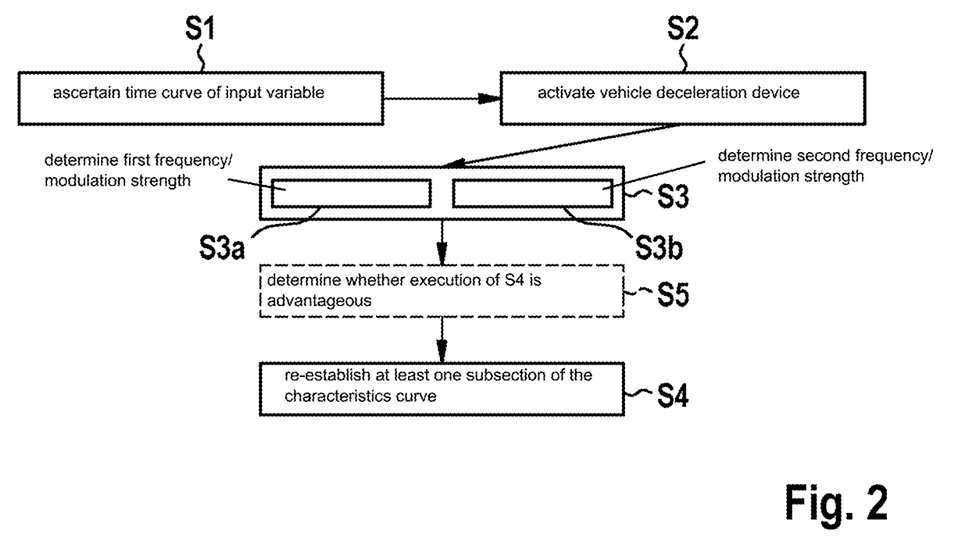
FIG. 2 shows a flow chart to explain a first specific embodiment of the method for operating a vehicle deceleration device of a vehicle.

FIG. 2 shows a flow chart to explain a first specific embodiment of the method for operating a vehicle deceleration device of a vehicle.

It is to be expressly noted that an ability to carry out the method described hereafter is not restricted to a specific type of the vehicle deceleration device or to a special vehicle type/motor vehicle type of the vehicle/motor vehicle equipped with the particular vehicle deceleration device.

In method step S1, a time curve of an input variable predefined by the driver of the vehicle with the aid of his or her actuation of the brake actuating element is ascertained. Examples of the brake actuating element and the input variable have already been listed above.

Simultaneously with method step S1, a method step S2 is carried out, in which the vehicle deceleration device is activate taking into account a characteristic curve and the updated input variable. The characteristic curve predefines a relationship between the input variable and a setpoint variable with respect to a setpoint vehicle deceleration to be exerted on the vehicle with the aid of the vehicle deceleration device. The activation of the vehicle deceleration device is preferably carried out in method step S2 in such a way that an instantaneous setpoint vehicle deceleration in accordance with the characteristic curve and the updated input variable is exerted on the vehicle with the aid of the vehicle deceleration device. Possible specific embodiments for the vehicle deceleration device have already been mentioned above.

In a further method step S3, the time curve of the input variable is examined for a possible occurrence of at least one modulation and/or variation of the input variable triggered by the driver. Moreover, in a method step S4, a reestablishment of at least one subsection of the characteristic curve is carried out in dependence on the possible occurrence of the at least one modulation and/or variation of the input variable triggered by the driver. An execution of method steps S1 through S4 thus also effectuates the above-described advantages.

In method step S3, for example, a frequency and/or a modulation strength of modulations and/or variations triggered by the driver during at least one brake application is determined. In an (optional) method step S5 carried out after method step S3, it may be decided whether an execution of method step S4 is advantageous.

For example, if it is established in method step S5 that the determined frequency is greater than a predefined frequency threshold value at least sectionally along the characteristic curve and/or the determined modulation strength is greater than a predefined strength threshold value at least sectionally along the characteristic curve, at least the at least one affected subsection of the characteristic curve is reestablished (as method step S4). As a partial step S3a of method step S3, at least one first frequency and/or at least one first modulation strength may be determined for at least one first characteristic curve during at least one first brake application. As a further partial step S3b of method step S3, for a second characteristic curve, which in each case includes at least one reestablished subsection in comparison to the at least one first characteristic curve, a second frequency and/or a second modulation strength may be determined during at least one second brake application. In method step S5, the at least one first frequency and/or the at least one first modulation strength may be compared to the second frequency and/or the second modulation strength. If it is established in method step S5 that an increase of modulations and/or variations of the input variable occurs at least sectionally along the second characteristic curve due to the frequencies being compared to one another and/or a strengthening of modulations and/or variations of the input variable occurs at least sectionally along the second characteristic curve due to the modulation strengths being compared to one another, at least the at least one affected subsection of the characteristic curve may be reestablished (as method step S4).

Figure 3:
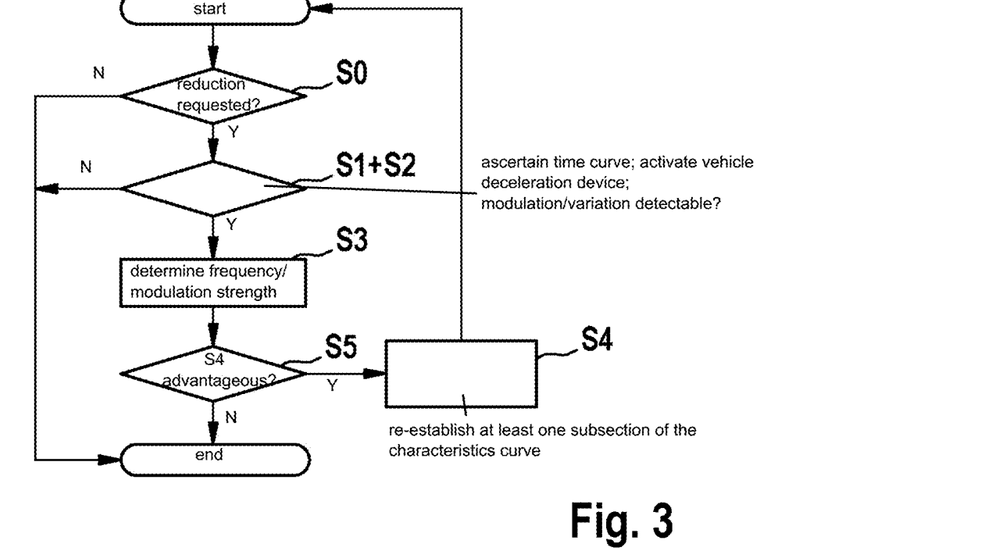
FIG. 3 shows a flow chart to explain a second specific embodiment of the method for operating a vehicle deceleration device of a vehicle.

FIG. 3 shows a flow chart to explain a second specific embodiment of the method for operating a vehicle deceleration device of a vehicle.

In an (optional) method step S0, it is examined whether a driver of the vehicle requests a reduction of speed/a deceleration of his or her (driving) vehicle with the aid of an actuation of a brake actuating element. If this applies, the method is at least continued with method steps S1 and S2.

If at least one modulation and/or variation of the input variable triggered by the driver is detectable on the time curve of the input variable, method step S3 is thus carried out. The method is then continued with method step S5. If it is detected in method step S5 that an execution of method step S4 is advantageous, the method is thus continued with method step S4. (Exemplary embodiments of method steps S3 and S5 for examining whether method step S4 is advantageous are described above).

In the specific embodiment of FIG. 3, a parameter adaptation on the basis of a preset characteristic is carried out in method step S4. For example, a number of characteristic curves and/or characteristic curve parameters are tested in succession according to a fixed/predefined sequence until the preferences of the driver are detected.

Figure 4:
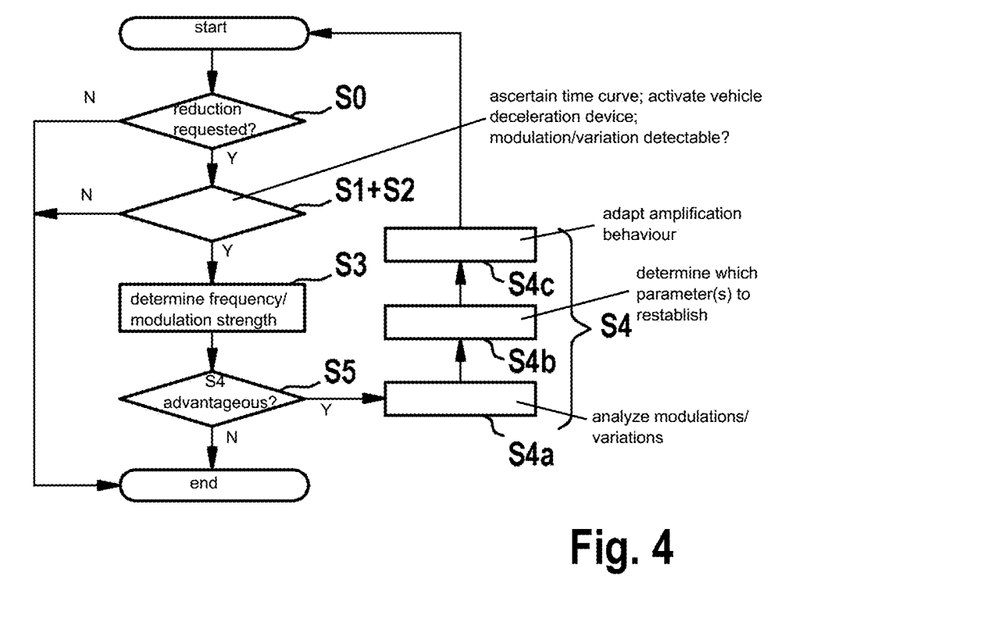
FIG. 4 shows a flow chart to explain a third specific embodiment of the method for operating a vehicle deceleration device of a vehicle.

FIG. 4 shows a flow chart to explain a third specific embodiment of the method for operating a vehicle deceleration device of a vehicle.

The method of FIG. 4 differs from the above-described specific embodiment in that method step S4 includes multiple partial steps: In one partial step S4a, the modulations and/or variations triggered by the driver of the input variable are analyzed. Subsequently, it is determined in a partial step S4b which parameter or parameters of the characteristic curve is/are reestablished to adapt the "entry behavior" of the characteristic curve. In a further partial step S4c, an adaptation of the "amplification behavior" of the characteristic curve is also carried out by reestablishing at least one parameter.

What is claimed is:

1. A control device for a vehicle deceleration device of a vehicle, comprising:
   an electronics unit, which is connectable to a brake actuating element of the vehicle and/or to at least one brake actuating element sensor of the vehicle, in such a way that a time curve of an input variable predefined by a driver of the vehicle using an actuation of the brake actuating element is evaluated using the electronics unit; and
   wherein the electronics unit stores a characteristic curve, the characteristic curve specifying a relationship between the input variable and a setpoint variable with respect to a setpoint vehicle deceleration to be exerted on the vehicle using the vehicle deceleration device;
   wherein the electronics unit is configured to activate the vehicle deceleration device taking into account the characteristic curve and the input variable in such a way that an instantaneous setpoint vehicle deceleration in accordance with the characteristic curve and the input variable is exerted on the vehicle using the vehicle deceleration device;
   wherein the electronics unit is configured to detect at least one modulation and/or variation of the input variable triggered by the driver, to reestablish at least one subsection of the characteristic curve taking into account the at least one modulation and/or variation of the input variable triggered by the driver, and to store a correspondingly changed characteristic curve,
   wherein the characteristic curve specifies a relationship between the input variable and a setpoint amperage to be output to a brake booster upstream from the brake master cylinder, and/or a relationship between the input variable and a setpoint speed of a motor of the brake booster, and/or a relationship between the input variable and a setpoint booster force of the brake booster, and/or relationship between the input variable and a setpoint brake pressure in at least one wheel brake cylinder of a hydraulic braking system, and/or a relationship between the input variable and a setpoint braking torque of the at least one wheel brake cylinder, and/or a relationship between the input variable and the setpoint vehicle deceleration,
   wherein the electronics unit is configured to, taking into account the characteristic curve and the input variable, activate, as the vehicle deceleration device: a brake booster upstream from a brake master cylinder, and/or at least one piston-cylinder device of a hydraulic braking system, and/or at least one pump of the hydraulic braking system; and
   wherein the at least one modulation and/or variation of the input variable is triggered by the driver, wherein the at least one modulation and/or variation of the input variable triggered by the driver corresponds to a trembling motion on the time curve of the input variable triggered by the driver.

2. The control device as recited in claim 1, wherein the electronics unit is configured to determine at least one first frequency and/or at least one first modulation strength during at least one first brake application for at least one first characteristic curve, to determine a second frequency and/or a second modulation strength during at least one second brake application for a second characteristic curve, which includes at least one reestablished subsection in comparison to the at least one first characteristic curve, to compare the at least one first frequency and/or the at least one first modulation strength to the second frequency and/or the second modulation strength, and, if: (i) an increase of modulations and/or variations of the input variable is established at least sectionally along the second characteristic curve based on the comparison of the first and second frequencies to one another, and/or (ii) a strengthening of modulations and/or variations of the input variable at least sectionally along the second characteristic curve is established based on the comparison of the first and second modulation strengths, the electronics unit is configured to reestablish at least one affected subsection of the second characteristic curve.

3. The control device as recited in claim 1, wherein the electronics unit is configured to examine a time curve of a pedal travel, and/or a time curve of an input rod travel, and/or a time curve of a differential motion, and/or a time curve of a driver brake force exerted on the brake actuating element, and/or a time curve of a brake master cylinder pressure in a brake master cylinder downstream from the brake actuating element, as the time curve of the input variable for a possible occurrence of at least one modulation and/or variation of the input variable triggered by the driver.

4. A vehicle deceleration device for a vehicle including a control device, the control device comprising:
   an electronics unit, which is connectable to a brake actuating element of the vehicle and/or to at least one brake actuating element sensor of the vehicle, in such a way that a time curve of an input variable predefined by a driver of the vehicle using an actuation of the brake actuating element is evaluated using the electronics unit; and
   wherein the electronics unit stores a characteristic curve, the characteristic curve specifying a relationship between the input variable and a setpoint variable with respect to a setpoint vehicle deceleration to be exerted on the vehicle using the vehicle deceleration device;
   wherein the electronics unit is configured to activate the vehicle deceleration device taking into account the characteristic curve and the input variable in such a way that an instantaneous setpoint vehicle deceleration in accordance with the characteristic curve and the input variable is exerted on the vehicle using the vehicle deceleration device;
   wherein the electronics unit is configured to detect at least one modulation and/or variation of the input variable triggered by the driver, to reestablish at least one subsection of the characteristic curve taking into account the at least one modulation and/or variation of the input variable triggered by the driver, and to store a correspondingly changed characteristic curve, wherein the characteristic curve specifies a relationship between the input variable and a setpoint amperage to be output to a brake booster upstream from the brake master cylinder, and/or a relationship between the input variable and a setpoint speed of a motor of the brake booster, and/or a relationship between the input variable and a setpoint booster force of the brake booster, and/or relationship between the input variable and a setpoint brake pressure in at least one wheel brake cylinder of a hydraulic braking system, and/or a relationship between the input variable and a setpoint braking torque of the at least one wheel brake cylinder, and/or a relationship between the input variable and the setpoint vehicle deceleration, wherein the electronics unit is configured to, taking into account the characteristic curve and the input variable, activate, as the vehicle deceleration device: a brake booster upstream from a brake master cylinder, and/or at least one piston-cylinder device of a hydraulic braking system, and/or at least one pump of the hydraulic braking system; and wherein the at least one modulation and/or variation of the input variable is triggered by the driver, wherein the at least one modulation and/or variation of the input variable triggered by the driver corresponds to a trembling motion on the time curve of the input variable triggered by the driver.

5. The vehicle deceleration device as recited in claim 4, wherein the vehicle deceleration device is the brake booster, or a piston-cylinder device, or a pump system including at least one pump, or the braking system.

6. A method for operating a vehicle deceleration device of a vehicle, comprising the following steps:
ascertaining a time curve of an input variable predefined by a driver of the vehicle with the aid of an actuation of a brake actuating element of the vehicle;
activating the vehicle deceleration device taking into account the input variable and a characteristic curve, which specifies a relationship between the input variable and a setpoint variable with respect to a setpoint vehicle deceleration to be exerted on the vehicle using the vehicle deceleration device, so that using the vehicle deceleration device, an instantaneous setpoint vehicle deceleration in accordance with the characteristic curve and the input variable, is exerted on the vehicle;
examining the time curve of the input variable for a possible occurrence of at least one modulation and/or variation of the input variable triggered by the driver; and
reestablishing at least one subsection of the characteristic curve as a function of the possible occurrence of the at least one modulation and/or variation of the input variable triggered by the driver,
wherein the characteristic curve specifies a relationship between the input variable and a setpoint amperage to be output to a brake booster upstream from the brake master cylinder, and/or a relationship between the input variable and a setpoint speed of a motor of the brake booster, and/or a relationship between the input variable and a setpoint booster force of the brake booster, and/or relationship between the input variable and a setpoint brake pressure in at least one wheel brake cylinder of a hydraulic braking system, and/or a relationship between the input variable and a setpoint braking torque of the at least one wheel brake cylinder, and/or a relationship between the input variable and the setpoint vehicle deceleration, wherein the electronics unit is configured to, taking into account the characteristic curve and the input variable, activate, as the vehicle deceleration device: a brake booster upstream from a brake master cylinder, and/or at least one piston-cylinder device of a hydraulic braking system, and/or at least one pump of the hydraulic braking system; and wherein the at least one modulation and/or variation of the input variable is triggered by the driver, wherein the at least one modulation and/or variation of the input variable triggered by the driver corresponds to a trembling motion on the time curve of the input variable triggered by the driver.

7. The method as recited in claim 6, wherein a frequency and/or a modulation strength of modulations and/or variations triggered by the driver during at least one brake application are determined.

8. The method as recited in claim 7, wherein, when the determined frequency is greater than a predefined frequency threshold value at least sectionally along the characteristic curve and/or the determined modulation strength is greater than a predefined strength threshold value at least sectionally along the characteristic curve, at least one affected subsection of the characteristic curve is reestablished.

9. The method as recited in claim 7, wherein:
for at least one first characteristic curve, at least one first frequency and/or at least one first modulation strength are determined during at least one first brake application;
for a second characteristic curve, which includes at least one reestablished subsection in each case in comparison to the at least one first characteristic curve, a second frequency and/or a second modulation strength are determined during at least one second brake application;
the at least one first frequency and/or the at least one first modulation strength are compared to the second frequency and/or the second modulation strength; and
when: (i) an increase of modulations and/or variations of the input variable is established at least sectionally along the second characteristic curve based on the comparison of the first and second frequencies to one another, and/or (ii) a strengthening of modulations and/or variations of the input variable is established at least sectionally along the second characteristic curve based on the comparison of the first and second modulation strengths to one another, at least one affected subsection of the characteristic curve is reestablished.

10. The control device as recited in claim 1, wherein:
the electronics unit is configured to determine a frequency and/or a modulation strength of modulations and/or variations triggered by the driver during at least one brake application, and
if the determined frequency is greater than a predefined frequency threshold value at least sectionally along the characteristic curve and/or the determined modulation strength is greater than a predefined strength threshold value at least sectionally along the characteristic curve, the electronics unit is configured to reestablish at least one affected subsection of the characteristic curve and to store a correspondingly changed characteristic curve.

11. The vehicle deceleration device as recited in claim 4, wherein:

the electronics unit is configured to determine a frequency and/or a modulation strength of modulations and/or variations triggered by the driver during at least one brake application, and if the determined frequency is greater than a predefined frequency threshold value at least sectionally along the characteristic curve and/or the determined modulation strength is greater than a predefined strength threshold value at least sectionally along the characteristic curve, the electronics unit is configured to reestablish at least one affected subsection of the characteristic curve and to store a correspondingly changed characteristic curve.

12. The method as recited in claim 6, wherein:

the electronics unit is configured to determine a frequency and/or a modulation strength of modulations and/or variations triggered by the driver during at least one brake application, and if the determined frequency is greater than a predefined frequency threshold value at least sectionally along the characteristic curve and/or the determined modulation strength is greater than a predefined strength threshold value at least sectionally along the characteristic curve, the electronics unit is configured to reestablish at least one affected subsection of the characteristic curve and to store a correspondingly changed characteristic curve.

* * * * *